Oct. 11, 1949.                    P. A. DUFFY, JR                    2,484,209
                                   PULSED OSCILLATOR
                                  Filed July 10, 1945
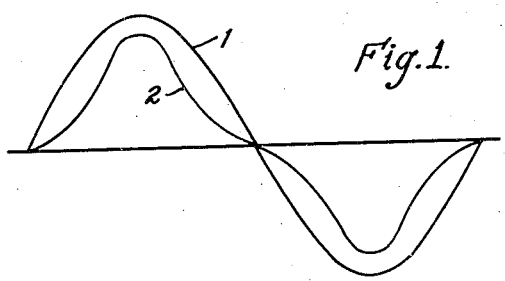
Fig.1.
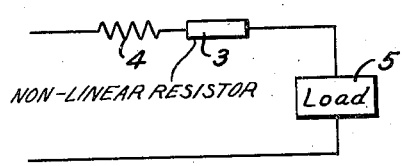
Fig.2.
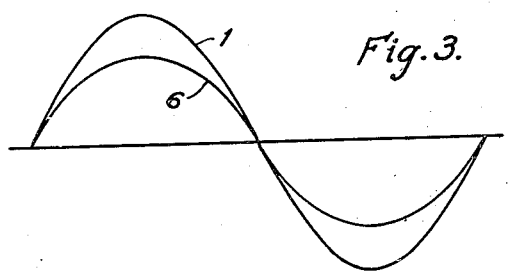
Fig.3.
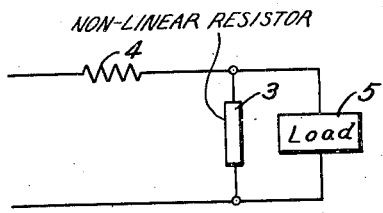
Fig.4.
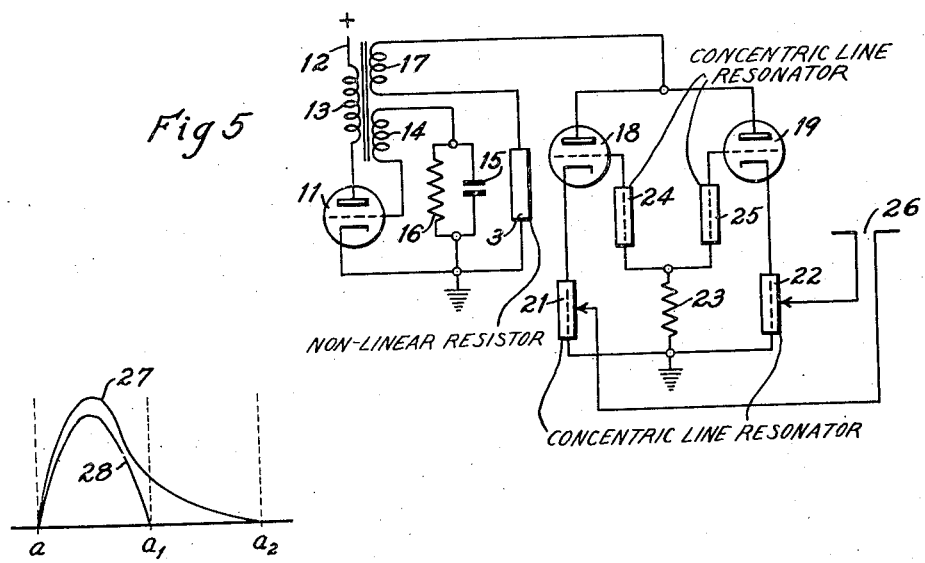
Fig.5.
Fig.6.
WITNESSES:
James F. Young
INVENTOR
Philip A. Duffy, Jr.
BY
F. W. Lyle
ATTORNEY Patented Oct. 11, 1949

2,484,209

UNITED STATES PATENT OFFICE 2,484,209

PULSED OSCILLATOR

Philip A. Duffy, Jr., Baltimore, Md., assignor to Westinghouse Electric Corporation, East Pittsburgh, Pa., a corporation of Pennsylvania Application July 10, 1945, Serial No. 604,271

4 Claims. (Cl. 250—36)

My invention relates to electrical current networks and in particular relates to an electric current network for supplying pulses of intermittent current.

For numerous purposes in the electrical arts it has become desirable to supply electric currents in the form of intermittent pulses separated from each other by switch periods of zero current. The output of radar systems which transmit sharply-defined pulses of electromagnetic energy is an example of such a field of use. In such cases, it is frequently desirable that the current pulses rise rapidly to a maximum and fall away to zero with similar abruptness. However, the presence in electric circuits of inductance and distributed capacitance frequently interposes difficulty in producing an abrupt decay to zero at the trailing edge of the pulse. The consequence of a failure of the trailing edge of the pulse to fall abruptly to zero is, in the case of radar systems, to limit the minimum range at which the radar can provide precise measurements.

One object of my invention is, accordingly, to provide an electric circuit in which current pulses with an abrupt decay or trailing edge may be produced.

Another object of my invention is to provide an electrical network in which sinusoidal waves applied to the input may produce sharply-peaked output currents.

Still another object of my invention is to provide a radar transmitter capable of improved precision of distance measurement.

A still further object of my invention is to provide a radar system in which the minimum range is substantially lower than that of radar systems of the prior art.

Other objects of my invention will become apparent upon a reading of the following description taken in connection with the drawings in which:

Figures 1 and 3 illustrate current and voltage wave forms characteristic of the networks embodying the principles of my invention.

Fig. 2 is a schematic diagram of an electrical network embodying the principles of one modification of my invention.

Fig. 4 is a similar schematic diagram of a different form of electrical network embodying the principles of my invention.

Fig. 5 is a schematic diagram of the circuit of a generator of electromagnetic waves to which my invention is applied, and Fig. 6 is a figure showing current wave forms useful in explaining the principles of my invention.

When a sinusoidal voltage wave, such as that marked 1 in Fig. 1, is impressed across a resistor having a volt-ampere characteristic curve, such, for example, as is characteristic of the ordinary metals, the current flowing through the circuit has a substantially similar sinusoidal wave form. However, resistors are known in which the current is proportional to a power of the voltage greater than unity, and when a sinusoidal voltage is impressed across the terminals of such a resistor, the current has the wave form marked 2 in Fig. 1. Such resistors will hereinafter be called bi-directional non-linear resistors. It will be observed that the wave form 2 is noticeably peaked and so is valuable where it is desirable to impress a voltage on the control electrode of an electrical discharge tube which is triggered and caused to change from the nonconductive to the conductive condition when its control electrode voltage exceeds a certain critical value. Such electrical discharge tubes are well known to be widely used in the electronic art.

The circuit of Fig. 2 shows such a resistor 3 connected in series with an ordinary resistor 4 and a load 5. There are a number of different kinds of bi-directional non-linear resistors known; for example, one sold under the name "Thyrite."

In contrast with the foregoing, it is likewise possible to connect such a bi-directional non-linear resistor into an electric circuit in such a way as to increase the radius of curvature at the peak of a sinusoidal current wave in a circuit on which a sinusoidal voltage wave is impressed. Thus, a sinusoidal voltage wave, such as the curve 1 in Fig. 3, may be made to yield a current having the form of the curve 6 in that figure.

The circuit arrangement adapted to produce the result last mentioned is shown in Fig. 4 in which a bi-directional non-linear resistor 3 is connected in shunt to a load 5, the two elements 3 and 5 being supplied in multiple by current flowing from a suitable alternating current source through an ordinary resistor 4.

One form of pulse generator suitable for radar systems is illustrated in Fig. 5.

A triode 11 has its cathode grounded and has its anode supplied from the positive terminal 12 of a suitable direct-current voltage source of which the negative terminal is grounded. The current flowing to the anode of the tube 11 from the terminal 12 is conducted through a winding 13 which is in inductive relation with a second winding 14 connected in series with the grid circuit of the tube 11 through a capacitor 15 shunted by a resistor 16. As is well known in the electronic art, it is possible by suitably proportioning the windings 13 and 14, the capacitor 15 and the resistor 16 to cause the triode 11 to intermittently generate one or more current pulses followed by an interval in which no current pulses are generated. Such triodes are commonly called "blocking oscillators," the constants of the electric circuits just described being variable to determine the relative lengths and frequencies of the current pulses and their "on" and "off" periods.

The winding 13 is likewise inductively linked to a winding 17 which is connected to the cathode of the tube 11 through a bi-directional non-linear resistor 3, such as has been described in connection with Figs. 1 through 4. The free terminal of the winding 17 is connected to the anodes of a radio frequency oscillator comprising a pair of electron tubes 18, 19. The cathodes of the tubes 18 and 19 are connected to ground through concentric line oscillators 21 and 22 or other forms of resonant circuit elements. The control electrodes of the tubes 18 and 19 are likewise connected to ground through a resistor 23 and to concentric line or other resonators 24, 25. A radiating dipole or other suitable antenna 26 has its terminals connected through a suitable transmission line to tap points on the sleeves of the resonators 21, 22. The system 18 through 26 will be recognized by those skilled in the art as a high frequency oscillation generator of a type which has been used particularly in short-wave work.

As previously stated, the tube 11 will generate one or more pulses separated from each other by intervals when no oscillations are generated, and such pulse will be impressed by the winding 17 on the anodes of the generator comprising tubes 18 and 19. As long as such a pulse continues, the tubes 18 and 19 will generate oscillations of a frequency determined by the tuning of the concentric line oscillators 21, 22, 24 and 25 and will radiate such oscillations from the antenna 26. However, the generation of such oscillations by the tubes 18, 19, and their radiation from the antenna 26 continues only so long as the voltage impressed by the winding 17 on the tubes 18, 19 exceeds a certain value. The result is that the system thus described will radiate into space from the antenna 26 intermittent pulses of electromagnetic energy separated from each other by null periods.

Were the resistor 3 in Fig. 5 replaced by the conventional ordinary resistor of the prior art, the electrical constants of the circuits of tubes 11, 18 and 19 are such that the amplitude of the oscillations set out by the antenna 26 would vary in time in accordance with the curve 27 in Fig. 6, where the distance between the points $aa_1$ is one-half cycle of the frequency generated of the blocking oscillator 11. It is thus clear from the curve 27 that while the oscillations sent out by the antenna 26 rise abruptly to a maximum, they do not fall away to zero with equal abruptness and, hence, have a trailing edge which is not ideally abrupt.

Conventional radar systems depend for use on the existence of an interval between the cessation of radiation of energy by the transmitter, and the arrival of the returning wave at the receiver, because the receiver is effectively disabled until the transmitter has ceased to send out energy. Thus, a non-abrupt decay of the trailing edge of the pulse, such as shown in curve 27 in Fig. 6, means that the receiver is disabled from registering a returning pulse until the time when the trailing edge of the curve 27 falls to zero. Since the minimum range of distance which the radar can measure is limited to the distance which will be traversed by electromagnetic radiation in the period before the receiver can begin functioning, any means which will eliminate the slowly decaying "tail" on the curve 27 will decrease the minimum range of the radar by permitting the receiver to function at an earlier time.

By reason of the fact that the resistor 3 in Fig. 5 is a bi-directional non-linear resistor, it will change the shape of the current curve in Fig. 6 to that represented by the number 28. In short, it will produce an abrupt trailing edge on the pulse radiated from the antenna 26 and make it possible for the receiver to begin operation at any time after the period $aa_1$. The minimum range of the radar will thus be reduced from the distance traversed by electromagnetic radiation in the period $aa_2$ to the distance traversed by electromagnetic radiation in the period $aa_1$. In actual practice, I have found that the reduction of the minimum range of the radar was reduced from 900 yards to 550 yards by the employment of a non-linear resistor 3.

I claim as my invention:

1. In combination with a generator of intermittent voltage pulses, a second pulse generator energized to generate electrical energy during the pulses of said first generator, and to generate energy at a lesser rate during the intervals between pulses of said first generator, and a connection for impressing the output of said first generator on said second generator to thus control it, said connection including a bi-directional unbiased non-linear resistor.

2. In combination with a blocking oscillator, a pulse generator energized from said blocking oscillator and arranged to generate a greater output energy during periods when said blocking oscillator is unblocked, and a connection for impressing the output voltage of said blocking oscillator on said pulse generator to thus control it, said connection comprising a resistor in which the current is proportional to a power of the voltage greater than unity, said resistor being unbiased.

3. In combination with a blocking oscillator having a cathode and a load circuit, a primary winding in said load circuit, a secondary winding in inductive relation to said primary winding, a pulse generator having an anode, a cathode and a control electrode, a circuit including said secondary winding and running from said anode through a non-linear impedance to the cathode of said blocking oscillator, a resonant circuit in the cathode lead of said pulse generator and a connection from the control electrode of said pulse generator to a point on said cathode lead.

4. In combination with a blocking oscillator having a cathode and a load circuit, a primary winding in said load circuit, a secondary winding in inductive relation to said primary winding, a pulse generator having an anode, a cathode and a control electrode, a circuit including said secondary winding and running from said anode through a non-linear resistor to the cathode of said blocking oscillator, a resonant circuit in the cathode lead of said pulse generator and a connection from the control electrode of said pulse generator to a point on said cathode lead.

PHILIP A. DUFFY, Jr.

REFERENCES CITED

The following references are of record in the file of this patent:

UNITED STATES PATENTS

| Number | Name | Date |
|---|---|---|
| 2,037,799 | Koch | Apr. 21, 1936 |
| 2,181,568 | Kotowski | Nov. 28, 1939 |
| 2,276,994 | Milinowski, Jr. | Mar. 17, 1942 |
| 2,284,444 | Peterson | May 26, 1942 |
| 2,295,585 | Lindquist | Sept. 15, 1942 |
| 2,390,489 | Archenbronn | Dec. 11, 1945 |
| 2,401,424 | Hershberger | June 4, 1946 |
| 2,405,552 | Blumlein et al. | Aug. 13, 1946 |